United States Patent [19]
Little et al.

[11] Patent Number: 5,747,405
[45] Date of Patent: *May 5, 1998

[54] CATALYST COMPOSITIONS AND PROCESS FOR PREPARING POLYOLEFINS

[75] Inventors: Ian Raymond Little, Hampton; John Paul McNally, Spencers Wood, both of England

[73] Assignee: BP Chemicals Limited, London, England

[*] Notice: The term of this patent shall not extend beyond the expiration date of Pat. No. 5,714,555.

[21] Appl. No.: 641,702

[22] Filed: May 2, 1996

Related U.S. Application Data

[63] Continuation of Ser. No. 112,099, Aug. 26, 1993, abandoned.

[30] Foreign Application Priority Data

Sep. 4, 1992 [GB] United Kingdom ............ 9218814
Apr. 20, 1993 [GB] United Kingdom ............ 9308078

[51] Int. Cl.$^6$ ............................................. C08F 4/642
[52] U.S. Cl. ............... 502/113; 502/117; 502/120; 502/119; 502/152; 502/154; 526/943; 526/114
[58] Field of Search ............................ 502/113, 117, 502/120, 119, 152, 154; 526/543

[56] References Cited

U.S. PATENT DOCUMENTS

| | | | |
|---|---|---|---|
| 5,071,808 | 12/1991 | Antberg et al. | 502/107 |
| 5,077,255 | 12/1991 | Welborn, Jr. | 502/104 |
| 5,169,818 | 12/1992 | Antberg et al. | 502/159 |

FOREIGN PATENT DOCUMENTS

| | | |
|---|---|---|
| 372414 | 6/1990 | European Pat. Off. . |
| 496193 | 7/1992 | European Pat. Off. . |

*Primary Examiner*—Mark Nagumo
*Attorney, Agent, or Firm*—Brooks Haidt Haffner & Delahunty

[57] ABSTRACT

Catalyst compositions comprising both metallocene complexes having polymerisable groups and polymerization catalysts eg Ziegler-Natta may be used for the preparation of polyolefins. The catalyst compositions may comprise the metallocene complex in the form of a polymer and may suitably be supported on inorganic supports. Polymers having a wide range of molecular weights and comonomer distributions may be prepared by use of the catalyst compositions. Preferred metallocene complexes are zirconium complexes in which the polymerisable group is vinyl.

14 Claims, 2 Drawing Sheets

CATALYST COMPOSITIONS AND PROCESS FOR PREPARING POLYOLEFINS

This application is a continuation of application Ser. No. 08/112,099 filed Aug. 26, 1993, now abandoned, for which the benefit of priority is claimed under 35 U.S.C. § 120.

The present invention relates to novel catalyst compositions and their use in the polymerisation of olefins.

Metallocene complexes of Group IVA metals such as (cyclopentadienyl)$_2$ZrCl$_2$ are known as homogeneous polyolefin catalysts in the presence of a suitable co-catalyst. Such catalyst systems have proven to be highly active towards ethylene and alpha olefins forming narrow molecular weight distributions of polyolefins.

It would however be highly desirable to provide catalyst systems having multicomponents which may be used, particularly in the gas phase, to prepare polymers having a wide molecular weight distribution.

We have now found that metallocene complexes having a polymerisable group may be used advantageously together with one or more polymerisation catalyst as components in catalyst compositions suitable for the polymerisation of olefins.

Accordingly, the present invention provides a catalyst composition comprising at least one polymerisation catalyst and at least one metallocene complex, said metallocene complex having the general formula I or II $$M[XR_n]_x Y_p \quad (I)$$

(II)

wherein R is a univalent or divalent 1–20C hydrocarbyl, or a 1–20C hydrocarbyl containing substituent oxygen, silicon, phosphorus, nitrogen or boron atoms with the proviso that at least one R group contains a polymerisable group and preferably contains at least three carbon atoms and when there are two or more R groups present they may be the same or different, and when R is divalent it is directly attached to M, and replaces a Y ligand, wherein X is an organic group containing a cyclopentadienyl nucleus, M is a Group IVA metal, Y is a univalent anionic ligand and for formula I, n is an integer of 1 to 10 x is either 1 or 2, and when x=1, p=0–3, that is, when all R are univalent, p=3; when one R is divalent, p=2, when two Rs are divalent, p=1 and when three Rs are divalent, p=0, when x=2, p=0–2, that is, when all R are univalent, p=2; when one R is divalent, p=1 and when two Rs are divalent, p=0, and for formula II, n, m and 1 are integers or 0 such that n+m+1≦1, p=0–2, that is, when all R are univalent, p=2; when one R is divalent, p=1 and when two Rs are divalent, p=0, and Z is a C$_1$ to C$_4$ alkylene radical or a dialkyl germanium or silicon or an alkyl phosphine or amine radical or bis-dialkylsilyl or bis dialkylgermanyl containing hydrocarbyl groups having 1 to 4 carbon atoms bridging the cyclopentadienyl nuclei.

The present invention provides a novel catalyst composition which comprises one or more polymerisation catalysts and one or more metallocene complexes wherein the metallocene complexes contain at least one polymerisable group.

The catalyst composition comprises an olefin addition polymerisation catalyst which may suitably be a Group IVA, VA or VIA metal catalyst (Ti, Zr, Hf, V or Cr) e.g. a metal oxide or metal organometallic compound such as a metallocene. Alternatively, the polymerisation catalyst may be a supported Ziegler Natta catalyst, for example, TiCl$_4$ supported on MgCl$_2$. The preferred polymerisation catalyst is a Ziegler Natta catalyst.

The Ziegler Natta catalyst comprises titanium and halogen, usually chloride and preferably also magnesium. The catalysts have a titanium component which may be in a 3 and/or 4 valency and as a co-catalyst an organoaluminium compound. They and their preparation are well described in the literature. Generally the titanium component is of formula TiCl$_a$ (OR)$_{4-a}$, where R represents alkyl, e.g. of 1–6 carbons, such as titanium tetrachloride, tetra ethyl or propyl titanate or mixtures thereof.

The titanium component may be impregnated onto a support, e.g. silica or alumina, or magnesium chloride, which may be in the form of particles or as a coating itself on a support, e.g. silica or alumina. The magnesium chloride particles may be of 10–100 microns and may be made by grinding larger particles. However, preferably they are substantially spherical and made by reacting an organomagnesium compound with an alkyl chloride or hydrogen chloride in an anhydrous solvent such as an aliphatic hydrocarbon; especially the latter reaction is performed in the presence of an electron donor such as an dialkyl ether such as dibutyl ether and/or aromatic carboxylate ester such as ethyl p-toluate and provides a magnesium chloride support also containing electron donor. Alternatively, Ziegler Natta catalysts may be made by coprecipitation of titanium and magnesium alkoxy halide from a mixture in an organic anhydrous solvent of titanium tetrachloride/tetraalkyl titanate and a magnesium alkoxy compound.

The metallocene complex of the present invention is a Group IVA metallocene of general formula I or II wherein M is suitably hafnium, zirconium or titanium. Preferably, M is zirconium.

In the metallocene complex of general formula I or II, X comprises a cyclopentadienyl nucleus. Suitably X represents a single ring cyclopentadienyl nucleus or a fused ring one such as indenyl or tetrahydroindenyl or fluorenyl nucleus. Preferably X is the cyclopentadienyl nucleus.

In the metallocene of general formula I or II when there are two or more R groups present these may be the same or may be different. At least one of R contains the polymerisable group, especially an olefinic group.

The R groups of the metallocene complex are independently organic hydrocarbyl groups, at least one of the R groups having a polymerisable group. For the purposes of the present invention, a polymerisable group may be defined as a group which can be incorporated into a growing polymer chain. The preferred polymerisable group of which R consists or comprises is an olefinic group. Preferably, the olefinic group consists of or comprises a vinyl group.

R may independently be an alkenyl group of suitably 2 to 20, preferably 3–20 especially 3–8 carbon atoms. The alkenyl may suitably be linear or branched, for example, an alkenyl group such as but-3-enyl or oct-7-enyl; or an alkenyl aryl, alkenyl cycloalkyl or alkenyl aralkyl group, each having 8 to 20 carbon atoms, especially p-vinyl phenyl or p-vinyl benzyl.

Additionally, one of the R groups may be a silyl group such as trimethyl silyl, triethyl silyl, ethyl dimethyl silyl, methyldiethyl silyl, phenyldimethyl silyl, methyldiphenyl silyl, triphenyl silyl and the like.

R may also represent an organic hydrocarbyl group such as an alkyl group of 1 to 10 carbon atoms such as methyl, ethyl propyl hydrocarbyl groups or a cycloalkyl group containing 5 to 7 carbon atoms, for example, cyclohexyl or an aromatic or aralkyl group of 6 to 20 or 7 to 20 carbon atoms respectively, for example, phenyl or benzyl.

m and n are at least 1 and not greater than 10, e.g. 1–5, the maximum value depending on the number of possible substituent positions available in the X nucleus. Where for example X is cyclopentadienyl, the maximum for n is 5 whilst the maximum of n is 7 for the indenyl nucleus.

Y is a univalent anionic ligand. Suitably the ligand is selected from hydride, halides, for example, chloride and bromide, substituted hydrocarbyls, unsubstituted hydrocarbyls, alkoxides, amides or phosphides, for example, a dialkylamide or a dialkyl or alkyl aryl phosphide group with 1 to 10 carbon atoms in each alkoxide or alkyl group and 6 to 20 carbons in the aryl group.

The preferred catalyst composition of the present invention comprises a Ziegler-Natta catalyst and a metallocene complex of general formula I wherein:

M is zirconium
R is $C_3$ to $C_{10}$ hydrocarbyl with a vinyl group
X is a cyclopentadienyl group
Y is chloride and
n is 1 or 5
x is 2, and
p is 2.

The preferred catalyst composition may also comprise a Ziegler-Natta catalyst and a metallocene complex of general formula II wherein:

M is zirconium
R is $C_3$ to $C_{10}$ hydrocarbyl with a vinyl group
X is an indenyl group
Y is chloride
n=m=1
l=0, and
Z is a $C_1$ to $C_4$ alkylene or a bis dimethylsilyl containing $C_1$ to $C_4$ hydrocarbyl group.

BRIEF DESCRIPTION OF THE DRAWINGS

Examples of suitable metallocene complexes of general formula I and general formula II are illustrated in the attached FIGS. 1 and 2 respectively.

Figure 1:
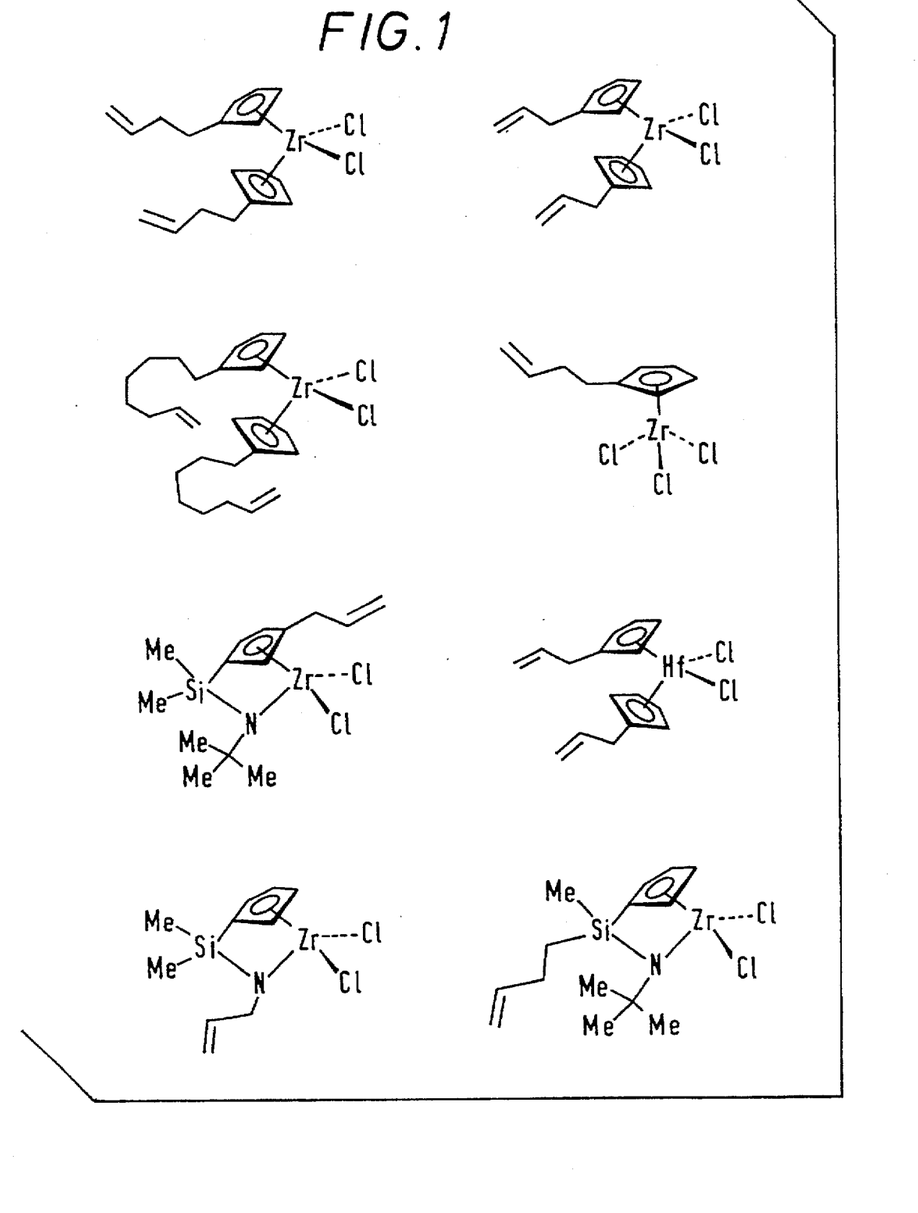
Figure 2:
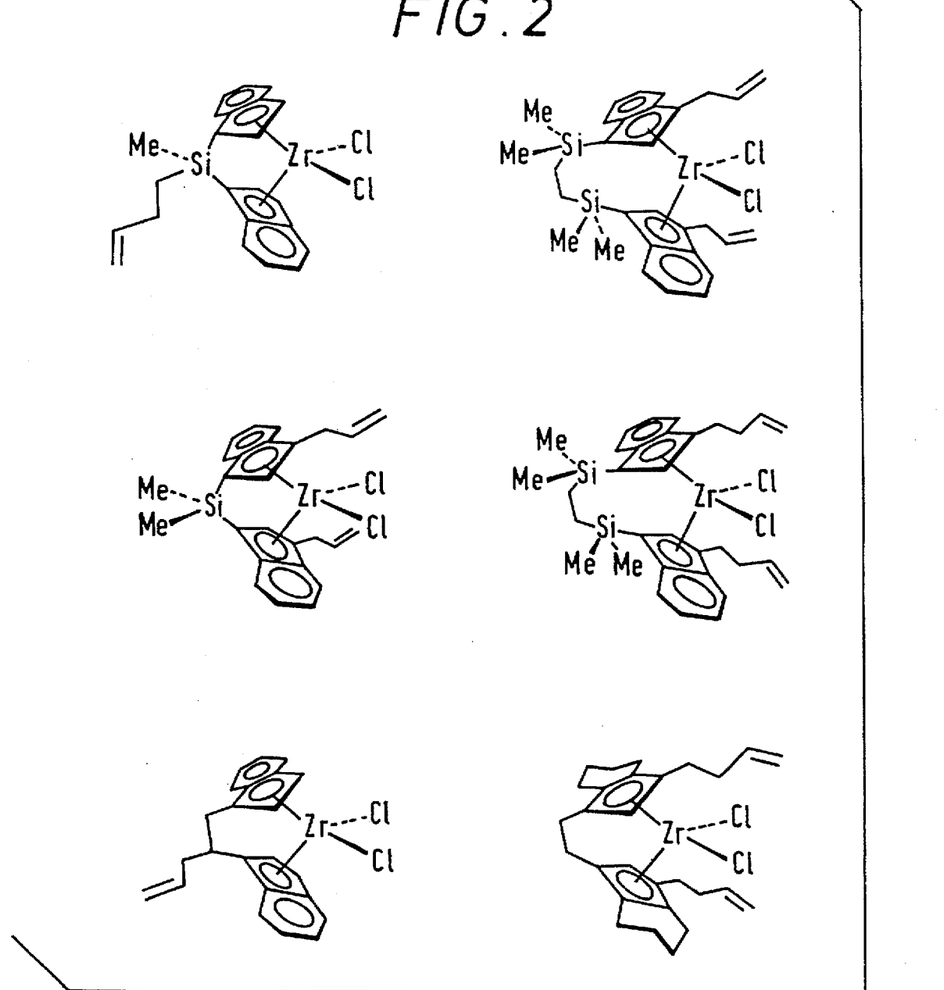

Metallocene complexes of general formula I, where x=2, and general formula II may suitably be prepared by reacting a suitable group IVA metal salt of the general formula $MYYCl_2$ with a compound with a polymerisable group containing a cyclopentadienyl anion of the general formula $[(R)_nX]M'$ or $[R_nX-ZR_l-XR_m]M'_2$. Suitably the M' is an alkaline metal. It is preferred that the Group IV metal salt is a tetra halide salt, most preferably a tetrachloride salt. It is preferred that the preparation of the metallocene complex is carried out in the presence of an anhydrous organic solvent such as an aliphatic ether such as diethyl ether or an aromatic hydrocarbon such as toluene or a cyclic ether such as tetrahydrofuran and under an inert atmosphere. The preferred conditions are in the presence of dry tetrahydrofuran and under dry nitrogen.

If a metallocene complex is to be prepared in which the R groups are different then for formula (I) where x=2 two different $[(R)_nX]M'$ compounds are used and for formula II, the appropriate mixed compound is used.

The salt of general formula $[(R)_nX]M'$ (III) may be prepared by any suitable method from the corresponding compound of formula $(R)_nXH$ (IV) by reaction with a suitable metal. Suitably, the metal is an alkaline metal selected from lithium, sodium or potassium. The metal may also be an organo hydrocarbyl alkali metal compound such as an alkyl or phenyl sodium, lithium or potassium compound. Preferably, it is a lithium compound.

The compound $(R)_nXH$ may itself be formed by reaction of a compound of general formula XM" (V) where M" is an alkali metal. Suitably XM" is sodium cyclopentadienide. XM" may be reacted with a compound R-R" where R is as defined above and R" is a suitable leaving group. Alternatively, XM" and X'M" may be reacted with $Z(R)_1R"_2$. R" may suitably be a nucleophilic leaving group. Preferably, R" is a halide selected from chloride, bromide or iodide, an ester group, especially a sulphonate ester such as alkane sulphonate or aryl sulphonate. Suitably, the aforementioned reactions are carried out in the presence of an anhydrous organic solvent and under an inert atmosphere.

Where it is desired to prepare the metallocene complex of general formula I wherein x is 1, the complex may suitably be prepared using procedures well known in the field. For example, the cyclopentadiene compound $X(R)_nH$ could be reacted with a metallating agent where the metal (M") is a Group I alkali metal to provide $X(R)_nM"$. Metallating agents include n-BuLi or MeLi. Suitably $X(R)_nM"$ is then reacted with trimethylsilyl chloride in an appropriate solvent to provide $(Me_3Si)X(R)_n$. Further reaction with a Group IV metal halide will suitably provide a metallocene complex of general formula $M[X(R)_n]Y_3$. This synthesis is particularly preferred for the preparation of the titanium metallocene, although variations of the synthesis can be used to prepare analogous zirconium and hafnium complexes. In another example, if $X(R)_n$ contains one or more functional groups with a protonated heteroatom, additional equivalents of the metallating reagent will deprotonate both the cyclopentadiene nucleus and one or more of the heteroatoms. Reaction of the metallated polyanion with a Group IV metal halide will suitably provide a metallocene complex of general formula $M[X(R)_n]Y_t$, where Y is halide and t=0–2. In this case, (3 − t) R groups will bridge the cylopentadienyl nucleus and the metal atom by means of a bond between the metal atom and a deprotonated heteroatom.

If desired the complexes of formula I or II wherein Y is halide may be converted into the complexes of formula I or II wherein Y is one of the other specified groups by reaction of the halide with an appropriate nucleophile e.g. alkoxide.

The metallocene complexes of general formula I and/or II, and/or the polymerisation catalyst of the catalyst composition of the present invention may suitably be supported on an inorganic support to provide a supported catalyst which provides another aspect of the invention. Any suitable inorganic support may be used, for example, inorganic oxides such as silica, alumina, silica-alumina mixtures, thoria, zirconia, magnesia, titania and mixtures thereof. Equally suitably inorganic halides may be used. Suitable halides include group IIA halides, e.g. magnesium chloride. The complex of formula I or II preferably comprises 0.01–50% by weight of said supported catalyst composition.

The metallocene complex and/or the polymerisation catalyst may suitably be impregnated onto the support material under anhydrous conditions and under an inert atmosphere. The solvent may then be evaporated under reduced pressure. The impregnated support may then be heated to remove any remaining solvent.

The metallocene complexes of general formula I and/or II may also be incorporated into a polymer which may be combined with a polymerisation catalyst as defined above to generate a catalyst composition according to another aspect of the present invention. The metallocene containing polymer usually contains a high group IVA metal content and is usually a low yield polyolefin, comprising one or more metallocene complexes of general formula I and/or II with one or more olefins.

The metallocene containing polymer may suitably be prepared by heating one or more metallocene complexes of formula I and/or II usually in the presence of an inert solvent and/or suitable co-catalysts as described further below and preferably in the presence of one or more alpha-olefins or ethylene, so that the metallocene complex is co-polymerised. Suitably, the alpha-olefin may be a C3–C10 olefin.

The metallocene containing polymer and the polymerisation catalyst may suitably be impregnated onto the support material under anhydrous conditions and under an inert atmosphere. The impregnation can be conducted using an inert solvent in which case the solvent may then be evaporated under reduced pressure. The impregnated support may then be evaporated under reduced pressure. The impregnated support may then be heated to remove any remaining solvent. Preferably, the metallocene containing polymer is dissolved in the inert solvent. Suitable inert solvents include aromatic hydrocarbons, such as toluene. Alternatively, and equally applicably, the metallocene containing polymer may be impregnated onto a supported polymerisation catalyst.

In another aspect of this invention, a catalyst composition containing a polymerisation catalyst and metallocene containing polymer may be prepared in one step. In this case, one of more metallocene complexes of formula I and/or II are combined with one or more polymerisation catalysts as described above under conditions in which the polymerisable group of the metallocene is incorporated into a polymer. Preferably, the polymerisation will be conducted in the presence of one or more alpha-olefins or ethylene so that the metallocene is copolymerised. Suitably, the alpha-olefin may be a C3–C10 olefin. The polymerisation catalyst is optionally and preferably supported. In this aspect of the invention, the catalyst component responsible for forming the metallocene containing polymer could be the metallocene or the polymerisation catalyst or a combination of the two. Suitably, one or more co-catalysts are present for the formation of the metallocene containing polymer.

It is a particular advantage of this aspect of the present invention that an active catalyst composition comprising a metallocene containing polymer may be supported on an inorganic oxide or metal halide support with a polymerisation catalyst without using cocatalysts such as aluminoxanes as the means of support. Aluminoxanes are expensive and difficult to handle and it is desirable to minimise their use. Conventionally, they are used as both a means of binding metallocenes to inorganic supports and as cocatalysts. The current invention obviates the need for aluminoxanes as a means of binding. This allows their use as cocatalysts only or not at all by selecting alternative cocatalysts, e.g. Bronsted or Lewis acids.

A further advantage of this aspect of the current invention is that it provides a support method which prevents desorption of metallocene complexes from a supported catalyst under certain polymerisation process conditions, e.g. slurry. Conventional metallocene support methods where the metallocene complex is simply adsorbed onto the support surface, with or without the use of cocatalysts such as aluminoxanes, may undergo some metallocene complex desorption under polymerisation process conditions.

The conditions of formation of the polymer are substantially similar to those for the polymerisation described hereafter, but with a lower degree of polymerisation, e.g. for a shorter time.

The catalyst compositions of the present invention may be used as catalysts in the polymerisation of olefins, particularly ethylene. The catalyst composition may contain at least two classes of active site namely that due to the metallocene and that due to the polymerisation catalyst.

If desired, both classes of active site may be retained during the olefin polymerisation reaction to provide a final polymer comprising polyolefins with differing molecular weight and/or branch distribution. Such polymers may, for example, have a multi-modal molecular weight distribution. Alternatively, one type of active site in the catalyst composition may be deactivated prior to use in the polymerisation reaction, the resulting polyolefin having a more uniform molecular weight and/or branch distribution. The latter option may be achieved by, for example, selectively deactivating the active site of the polymerisation catalyst by chemical treatment or choosing a polymerisation catalyst and/or conditions which give rise to low polymerisation activity relative to that of the metallocene sites. Alternatively, the relative proportions of the catalytically active components of the catalyst composition may be chosen to adjust the polymerisation catalyst activity to give the desired polymer properties.

When used for the polymerisation of olefins the catalyst compositions of the present invention are employed in combination with a cocatalyst.

The catalyst compositions may therefore comprise a suitable co-catalyst. Suitably the co-catalyst is an organometallic compound having a metal of Group IA, IIA, IIB or IIIB of the periodic table. Preferably, the metals are selected from the group including lithium, aluminium, magnesium, zinc and boron. Such co-catalysts are known for their use in polymerisation reactions, especially the polymerisation of olefins, and include organo aluminium compounds such as trialkyl, alkyl hydrido, alkylhalo and alkyl alkoxy aluminium compounds. Suitably each alkyl or alkoxy group contains 1–16 carbons. Examples of such compounds include trimethylaluminium, triethylaluminium, diethyl aluminium hydride, triisobutyl aluminium, tridecyl aluminium, tridodecyl aluminium, diethyl aluminium methoxide, diethyl aluminium ethoxide, diethyl aluminium phenoxide, diethyl aluminium chloride, ethyl aluminium dichloride, methyl diethoxy aluminium and methyl aluminoxane. The preferred compounds are alkyl aluminoxanes, the alkyl group having 1 to 10 carbon atoms, especially methyl aluminoxane. Where Y in the general formula I or II is independently hydrogen or hydrocarbyl, suitable co-catalysts also include Bronsted and Lewis acids. These cocatalysts may also be used to prepare metallocene containing polymer.

The catalyst composition may suitably comprise one or more cocatalysts. Suitably, two different co-catalysts are present, for example, one selected for the polymerisation catalyst, for example, trialkyl aluminium and a second for the metallocene complex, for example, alkyl aluminoxane. Suitably the amount of co-catalyst for mixing with the metallocene of formula I or II is such as to provide an atom ratio of M from the metallocene to the metal of the co-catalyst of 1–10,000:10,000–1 in the case of aluminoxanes and 1–100:100–1 otherwise.

Suitably, where one or more active sites needs a cocatalyst, the co-catalyst or co-catalysts may be added at different times and in different orders of addition to obtain different products.

The catalyst composition of the present invention may be prepared and then transferred under inert conditions to an olefin polymerisation reactor. Alternatively, the catalyst composition may be prepared in-situ in the polymerisation chamber.

The present invention therefore provides a process for the production of polyolefins, in particular homopolymers of ethylene and copolymers of ethylene with minor amounts of at least one C3 to C10, preferably C3 to C8 alpha-olefin. The process comprises contacting the monomer or monomers, optionally in the presence of hydrogen, with an olefin polymerisation catalyst composition according to any aspect of the present invention at a temperature and pressure sufficient to initiate the polymerisation reaction. Suitably the alpha olefin may be propylene, butene-1, hexene-1, 4-methylpentene-1 and octene-1 and may be present with the ethylene in amounts of 0.001- 80% by weight (of the total monomers). The polymers or copolymers of ethylene thus obtained can have densities, in the case of homopolymers of about 950 to 960 or 965 kg/m$^3$ or in the case of copolymers, as low as 915 kg/m3 or even lower e.g. less than 900 kg/m3. The C3 to C8 alpha-olefin content in the copolymers of ethylene can be about from 0.01% to 10% by weight or more.

The olefin polymerisation catalyst according to the present invention can be used to produce polymers using solution polymerisation, slurry polymerisation or gas phase polymerisation techniques. Methods and apparatus for effecting such polymerisation reactions are well known and described in, for example, Encyclopaedia of Polymer Science and Engineering published by John Wiley and Sons, 1987, Volume 7, pages 480 to 488 and 1988, Volume 12, pages 504 to 541. The catalyst according to the present invention can be used in similar amounts and under similar conditions to known olefin polymerisation catalysts.

The polymerisation may optionally be carried out in the presence of hydrogen. Hydrogen or other suitable chain transfer agents may be employed in the polymerisation to control the molecular weight of the produced polyolefin. The amount of hydrogen may be such that the percentage of the partial pressure of hydrogen to that of olefin(s) is from 0.01–200%, preferably from 0.05–10%.

Typically, the temperature is from 30° to 110° C. for the slurry or "particle form" process or for the gas phase process. For the solution process the temperature is typically from 100° to 250° C. The pressure used can be selected from a relatively wide range of suitable pressures, e.g. from subatmospheric to about 350 MPa. Suitably, the pressure is from atmospheric to about 6.9 MPa, or may be from 0.05–10, especially 0.14 to 5.5 MPa. In the slurry or particle form process the process is suitably performed with a liquid inert diluent such as a saturated aliphatic hydrocarbon. Suitably the hydrocarbon is a $C_4$ to $C_{10}$ hydrocarbon, e.g. isobutane or an aromatic hydrocarbon liquid such as benzene, oluene or xylene. The polymer is recovered directly from the gas hase process or by filtration or evaporation from the slurry process or evaporation from the solution process.

The catalyst compositions of the present invention are particularly suitable for use in the gas phase.

By using the catalyst compositions of the present invention broad molecular weight polymers may be produced using a single catalyst in which the metallocene component produces one molecular weight range polymer and the polymerization catalyst e.g. Ziegler produces another.

Such broad molecular weight polymers are preferred for certain products for example high strength pipe, blow moulding, tough film, etc wherein the strength is derived from the high molecular weight component and processability from the low molecular weight component without which the polymer is generally too viscous to be conveniently extruded.

It is also possible to obtain variations in comonomer distribution as a function of molecular weight by using catalyst components with different comonomer incorporation rates.

The combined catalyst compositions offer the potential to achieve a wide range of molecular weight and comonomer distributions and to produce easily processable polymer grades for example high strength film grades.

Melt Index Measurement

The Melt Index (MI) of the polymers produced was determined according to ASTM D1238 Condition E, 2.16 kg at 190° C. while the High Load Melt Index (HLMI) was according to ASTM D1238 condition F, 21.6 kg at 190° C.

Method for Measuring the Molecular Weight Distribution

The molecular weight distribution of a (co)polymer is calculated according to the ratio of the weight-average molecular weight, Mw, to the number-average molecular weight distribution curve obtained by means of a "WATERS" (trademark) model "150 C" gel permeation chromatograph (High Temperature Size Exclusion Chromatograph), the operating conditions being the following:

solvent: 1,2,4-trichlorobenzene;

solvent flow rate: 1.0 ml/minute;

three "SHODEX" (trademark) model "AT 80 MS" columns of 25 cm length are employed;

temperature: 145° C.;

sample concentration: 0.1% by weight;

injection volume: 500 microliters;

Universal standardisation using monodisperse polystyrene fractions.

The present invention will now be further illustrated with reference to the following examples:

All of the reactions and purifications detailed below involving organometallic species were carried out under a dry nitrogen atmosphere using standard vacuum-line techniques. Tetrahydrofuran and diethyl ether were dried over sodium benzophenone ketyl and distilled. Toluene was dried over sodium-potassium and distilled.

Dichloromethane was dried over 4 Å molecular sieves. All other reagents were used as received.

EXAMPLE 1

Preparation of Bis (3-butenylcyclopentadienyl) zirconium Dichloride

Step (a) Preparation of 3-buten-1-tosylate

To a solution of 100 g (525 mmol) p-toluenesulphonyl chloride 20 in 200 ml of dry pyridine cooled to 0C. was added 21.1 g (29.3 mmol) 3-buten-1-ol. The reaction solution was thoroughly mixed and allowed to stand in a refrigerator at −5° C. overnight. The reaction mixture was then poured with stirring into 200 g of ice/water. The oily tosylate product was extracted from the aqueous mixture with 3×300 ml aliquots of ether. The combined ethereal fractions were washed twice with 300 ml of cold aqueous hydrochloric acid (conc HCl:water 1:1 w/w) to remove pyridine and then with 300 ml water, dried over potassium carbonate and sodium sulphate and decolourised with activated carbon. The suspension was filtered and the ether evaporated from the filtrate under reduced pressure to leave a pale yellow oil. The oil was then washed with cold pentane to remove impurities and induce crystallisation. 51.0 g of spectroscopically pure product ($^1$H NMR) as a microcrystalline white solid were isolated (225 mmol, 76.7%).

Step (b) Preparation of 3-butenylcyclopentadiene

To a solution of 25.0 g (110 mmol) 3-buten-1-tosylate prepared according to step (a) above in 200 ml THF cooled to 0° C. was added 68.9 ml of 2.0 M (138 mmol) sodium cyclopentadienylide in THF. The reaction mixture was allowed to warm to room temperature and was stirred for 16 h. 100 ml concentrated aqueous saline solution was added and the product extracted with ether (3×75 ml). The combined organic fractions were dried over magnesium sulphate for 2 hours, filtered and the solvents removed under reduced pressure using a rotary evaporator to yield a dark brown oil. The crude product was distilled under reduced pressure (b.p. 50°–51° C. @ 15 mm Hg) to give 5.71 g of a colourless oil (47.6 mmol, 43.3%).

Step (c) Preparation of Bis(3-butenylcyclopentadienyl) zirconium Dichloride 19 ml of 2.5M (47.5 mmol) butyllithium in mixed $C_6$ alkane solvent was slowly added to 5.7 g (47.5 mmol) 3-butenylcyclopentadiene prepared according to step (b) above in 50 ml THF cooled to 0° C. and stirred for 1 hour. The lithium 3-butenyl cyclopentadienylide solution produced was added to 4.43 g (19.0 mmol) zirconium tetrachloride in 50 ml THF cooled to 0° C. and stirred for 65 hours. The volatiles were removed under vacuum and the residue extracted with ether and filtered. The product was precipitated as a microcrystalline white solid upon slow cooling of the solution to −50° C. Recrystallisation from cold ether (−12° C.) yielded 1.54 g of spectroscopically pure product ($^1$H NMR) as colourless needles (3.85 mmol, 20.2%).

EXAMPLE 2

Preparation of Bis(3-propenylcyclopentadienyl) zirconium Dichloride

Step (a) Preparation of 3-Propenylcyclopentadiene

To a rapidly stirred solution of allylbromide (42.73 g; 0.35 mol) dissolved in dry THF (200 ml) at 0° C. was added a solution of sodium cyclopentadiene (220 ml, 2.0M; 0.44 mol) in THF. The reaction was stirred for 2 hrs during which time it was allowed to warm to room temperature. Iced water (1500 ml) was added and the organic product extracted with diethyl ether (3×400 ml). The combined organic fractions were dried over magnesium sulphate overnight, filtered and the solvents removed under reduced pressure using a rotary evaporator to yield a pale brown oil. The crude product was distilled under reduced pressure (b.p. 35°–45° C. @ 17 ml Hg) to give 11.17 g of a colourless oil (0.105 mol, 33.3%).

Step (b) Preparation of bis (3-propenylcyclopentadienyl) zirconium Dichloride Methyllithium solution (75.25 ml, 1.4M; 0.105 mol) in diethyl ether was slowly added to a rapidly stirred solution of propenylcyclopentadiene (11.17 g, 0.105 mol) in dry diethyl ether at 0° C. The reaction was warmed to room temperature and stirring continued until gas evolution had ceased. The precipitated lithium propenylcyclopentadienylide was isolated by filtration, washed with diethyl ether (2×100 ml) and pumped to dryness to give 10.65 g (0.095 mol) of fine white powder. To a rapidly stirred THF solution (100 ml) of the lithium propenylcyclopentadienylide at 0° C. was added zirconium tetrachloride (11.09 g, 47.5 mmol) dissolved in dry THF (100 ml). The reaction mixture was allowed to warm to room temperature and was stirred for 16 hrs. The volatiles were removed under vacuum and the residue extracted with diethyl ether (4×100 ml) and filtered. The product was obtained as a microcrystalline white solid upon slow cooling of the solution to −78° C. Recrystallisation from cold ether yielded 13.33 g of spectroscopically pure product ($^1$H NMR) as colourless needles (35.8 mmol, 75.4%).

EXAMPLES 3–6

Polymerisation of Ethylene

The polymerisation reaction was carried out in a 100 liter bench reactor using 25 liters of isobutane as diluent. The total pressure maintained throughout the reaction was 2.07 MPa (300 psi). The reaction was carried out at 60°0C.

The reactor was heated to 100° C. and purged with dry nitrogen to attain a dry inert atmosphere. 25 liters of isobutane was then added to the reactor, followed by an appropriate amount of hydrogen. The reactor was then pressurised up gradually to the operating pressure of 2.07 MPa (300 psi) with stirring.

A quantity of trimethyl aluminium co-catalyst in toluene (2M, 5.5 ml) containing the metallocene complex as prepared according to Example 1 was added to the reactor and stirred under a blanket of ethylene. $TiCl_4$ supported on $MgCl_2$ (Ziegler Natta catalyst as described in Example 1 of GB 1359547) was then injected into the reactor. The contents of the reactor were stirred for 20 minutes at 100° C. Methyl aluminoxane (55 cm$^3$, 2M with respect to aluminium, Examples 3–5; 85 cm$^3$, 2M with respect to aluminium, Example 6) was then added and the polymerisation left to continue for a further 40 minutes at 100° C. The reaction was terminated by purging with nitrogen and adding acidified methanol. The reactor contents were then vented to leave a slurry from which dry white polymer was isolated by filtration, washed with methanol and vacuum dried. The Melt Indices (MI, HLMI, MIR) and molecular weights were determined as described above.

The process was repeated in Comparative Examples (CE1 and 2) in which the Ziegler Natta catalyst (and $Me_3Al$) or the metallocene complex (and MAO) respectively were absent.

The process details and properties of the polymer obtained are given in Table 1.

EXAMPLES 7–9

Preparation of Metallocene Containing Polymer

A solution of MAO in toluene was added to the metallocene and the solution stirred to dissolve the metallocene. The mixture was heated to 50° C. and ethylene introduced at a measured flow rate. After the ethylene flow was stopped the mixture was filtered and the solid polymer washed with 5×25 aliquots of toluene at room temperature.

A sample of each polymer (0.5–1 g) was transferred anaerobically to a round bottom flask. 100 ml toluene was added and the mixture stirred while the flask was heated to 100° C. for 3 hrs resulting in a clear pale yellow solution. The flask was cooled to room temperature resulting in reprecipitation of the polymer. The solution was filtered and the polymer washed with 5×25 aliquots of toluene at room temperature.

The preparative details for each polymer and the zirconium content before and after toluene washing are given in Table 2.

Due to the high solubility of the free metallocene complex in toluene the zirconium content before and after washing indicates that the metallocene complex has been incorporated into the polymer.

EXAMPLE 10

Preparation of Ziegler Catalyst 19.65 g of Crossfield ES70 (calcined at 800° C. for 5 hrs in flowing nitrogen) was slurried in 200 ml n-hexane and a solution of 29.5 ml (1M) dibutylmagnesium in n-hexane added during 1 hr with stirring at ambient temperature. The reaction was continued for a further hour and the slurry filtered. The residue was washed with n-hexane and filtered and the washing repeated twice before solvent traces were removed from the residue under vacuum at ambient temperature.

The residue was stirred with 200 ml n-hexane and a solution of 2.78 g tert-butyl chloride in 30 ml n-hexane added over 1 hr with stirring at 50C. The reaction was continued for a further 1 hr and filtered and washed. The residue was re-slurried in 200 ml n-hexane and 0.153 g titanium tetrachloride in 30 ml n-hexane added over 1 hr with stirring at ambient temperature. The reaction was continued for a further 1 hr. followed by filtration and re-slurrying in 200 ml n-hexane. A solution of 1.082 g titanium butoxide in 30 ml n-hexane was added over 1 hr. with stirring at ambient temperature. The reaction was continued for a further hour before filtration and washing with 200 ml n-hexane. The filtration and washing was repeated twice more before the residue was obtained free from solvent under vacuum at ambient temperature. The titanium loading of the catalyst was 1.21% w/w.

EXAMPLE 11

Preparation of Supported Polymer 0.6 g of the polymer prepared according to Example 9 was dissolved in 20 ml toluene at 80° C. and added to 3.05 g of the silica supported Ziegler catalyst prepared according to Example 10 with stirring. The solvent was removed under vacuum while maintaining the temperature at 80° C. to yield a white, free-flowing powder having 0.12% w/w Zr.

Examples 12-13 Polymerisation of Ethylene

Supported polymer as prepared in Example 11 was added to a 3 liter reactor containing 1.5 liters isobutane and 9.6 mmol MAO (4 ml of 2.4M toluene solution). Hydrogen was introduced at the required pressure and the temperature raised to 75° C. Ethylene was introduced to maintain a constant total pressure of 28.1 bar and the reaction continued for 1 hr. before quenching by venting to atmospheric 5 pressure and the addition of 2-propanol. Details and polymerisation results are given in Table 3.

From the Table it can be seen that the catalyst compositions using a polymer of the metallocene complex have high activity and lead to broad molecular weight polymers.

TABLE 1

| Example | Catalyst Concentration | $H_2$ (psi) | MI (2.16) | HLMI (21.6) | MIR | $M_n$ | $M_w$ | Bimodal Mol wt Distbn. | $M_w/M_n$ Polydisper. |
|---|---|---|---|---|---|---|---|---|---|
| 3 | A (1.1 mM Ti) B (45 mg) | 50 | 0.12 | 4.46 | 37.2 | 1200 | 220000 | Yes | 183.3 |
| 4 | A (1.1 mM Ti) B (45 mg) | 100 | 0.98 | 52.7 | 53.9 | 1100 | 170000 | Yes | 154.5 |
| 5 | A (0.3 mM Ti) B (45 mg) | 20 | 0.015 | 1.06 | 70.6 | 2100 | 291000 | Yes | 138.6 |
| 6 | A (0.3 mM Ti) B (70 mg) | 20 | 0.317 | 1803 | 5687 | 2400 | 189000 | Yes | 80.1 |
| CE1 | A (0) B (45 mg) | 20 | Very high | Very high | — | 1300 | 14400 | No | 11.1 |
| CE2 | A (0.6 mM Ti) B (0) | 20 | — | 0.13 | — | 72000 | 566000 | No | 7.9 |

A: $MgCl_2/TiCl_4$ catalyst
B: Zirconium compound from Example 1
MIR: Melt Index Ratio
MI: Melt Index

TABLE 2

| Example | Metallocene | Quantity/ mmol | MAO/ mmol | Solvent/ ml | $C_2$ flow Rate/ ml/min | Reaction Time/ h | Polymer Yield/ g | Zr Content/% Before Washing | After Washing |
|---|---|---|---|---|---|---|---|---|---|
| 7 | Propenylzirconium Dichloride | 4 | 240 | 40 | 33 | 6.17 | 9 | 0.87 | 0.76 |
| 8 | Propenylzirconium Dichloride | 4 | 240 | 40 | 6.5 | 21.17 | 4.4 | 0.70 | 0.70 |
| 9 | Propenylzirconium Dichloride | 4 | 240 | 40 | 30 | 6 | 9.8 | 0.68 | 0.74 |

TABLE 3

| Amount/ g | Hydrogen/ psi | Polymer Yield/ g | Activity/ gPE/gcat.h.b (/gPE/mmol M. h.b.) | HLMI/MI/MIR | $M_w$ | $M_w/M_n$ |
|---|---|---|---|---|---|---|
| 0.193 | 20 | 105.5 | 49.7 (224.1) | 6.1/0.04/141 | 430,000 | 271 |
| 0.178 | 2 | 87.1 | 38.0 (171.4) | 18.6/0.26/73 | 454,000 | 25.1 |

We claim:

1. A catalyst composition for use in the polymerization of olefins comprising: (a) at least one polymerization catalyst designated (A) selected from the group consisting of a Ziegler-Natta catalyst, a Group IVA metal compound, a Group VA metal compound and a Group VIA metal compound, (A) not being a metallocene of formula I or II of b; and (b) a polymer of an olefin and at least one metallocene of the general formula I or II wherein R is a monovalent or divalent 1–20 carbon hydrocarbyl, or a 1–20 carbon hydrocarbyl containing substituent oxygen, silicon, phosphorus, nitrogen or boron atoms with the proviso that at least one R group contains a polymerizable olefinic group containing 3 to 20 carbon atoms, and when there are two or more R groups present they may be the same or different, and when R is divalent it is directly attached to M, and replaces a Y ligand, wherein X is cyclopentadienyl or indenyl nucleus, M is a Group IVA metal, Y is a monovalent anionic ligand, and for formula I, n is an integer of 1 to 10 x is either 1 or 2, and when x=1, p=0 to 3, when x=2, p=0 to 2 and for formula II n and m are integers or 0 such that n+m≥1, p=0–2, and

Z is a radical selected from the group consisting of a $C_1$ to $C_4$ alkylene, a dialkyl germanium, an alkyl phosphine, an amine, bis-dialkyl silyl, and bis-dialkylgermanyl containing a hydrocarbyl group having 1 to 4 carbon atoms.

2. A catalyst composition according to claim 1 wherein M in general formula I or II is zirconium.

3. A catalyst composition according to claim 1 wherein the olefinic group is a terminal group.

4. A catalyst composition according to claim 1 wherein the polymerisation catalyst (A) and/or the metallocene complex are supported on an inorganic support.

5. A catalyst composition according to claim 4 wherein the inorganic support is selected from the group consisting of silica, alumina and a Group II metal halide.

6. A catalyst composition according to claim 1 wherein the polymerisation catalyst (A) and polymer are supported on an inorganic support.

7. A catalyst composition according to claim 1 further comprising a cocatalyst.

8. A catalyst composition according to claim 7 wherein the cocatalyst is a Group IA, IIA, IIB or IIIB organometallic compound.

9. A catalyst composition according to claim 8 wherein the cocatalyst is an organoaluminium compound.

10. A process for preparing the catalyst composition according to claim 1 characterised in that the metallocene complex, olefin and the polymerisation catalyst (A) are contacted together in the presence of an inert solvent and/or cocatalyst.

11. A process for preparing the catalyst composition according to claim 1 characterised in that polymer is dissolved in an inert solvent and deposited on the polymerisation catalyst (A) supported on an inorganic support.

12. A catalyst composition for use in the polymerization of olefins comprising: (a) at least one polymerization catalyst designated (A) not being a metallocene and selected from the group consisting of a Ziegler-Natta catalyst, a Group IVA metal compound, a Group VA metal compound, and a Group VIA metal compound, and (b) at least one metallocene selected from the group consisting of bis-(3-butenyl cyclo-penta-dienyl) zirconium dichloride and bis-(3-propenylcyclopentadienyl) zirconium dichloride.

13. A catalyst composition as claimed in claim 12 wherein said metallocene (b) is bis-(3-butenyl-cyclopentadienyl) zirconium dichloride.

14. A catalyst composition as claimed in claim 12 wherein said metallocene (b) is bis-(3-propenyl-cyclopentadienyl) zirconium dichloride.

* * * * *

UNITED STATES PATENT AND TRADEMARK OFFICE
CERTIFICATE OF CORRECTION

PATENT NO. : 5,747,405
DATED : May 5, 1998
INVENTOR(S) : Ian Raymond LITTLE et al.

It is certified that error appears in the above-identified patent and that said Letters Patent is hereby corrected as shown below:

Column 1, line 55, correct "$n+m+1 \leq 1$" to read --$n+m+1 \geq 1$--.

Column 3, line 1, after "ethyl" insert a comma.

Column 8, line 51, after "chloride" delete "20".

Column 9, line 48, "17 ml" should read --17 mm--.

Column 12, line 22, after "atmospheric" delete "5".

Signed and Sealed this

Thirteenth Day of October 1998

*Attest:*

*Attesting Officer*

BRUCE LEHMAN
*Commissioner of Patents and Trademarks*